United States Patent [19]

Ritchie

[11] Patent Number: 4,467,266
[45] Date of Patent: Aug. 21, 1984

[54] BATTERY OVERCHARGE PROTECTION SYSTEM

[75] Inventor: John A. Ritchie, Jefferson Township, Morris County, N.J.

[73] Assignee: McGraw-Edison Company, Rolling Meadows, Ill.

[21] Appl. No.: 363,240

[22] Filed: Mar. 29, 1982

[51] Int. Cl.³ .............................................. H02J 7/04
[52] U.S. Cl. ...................................... 320/40; 320/18; 320/43
[58] Field of Search ....................... 320/17, 18, 39, 40, 320/43, 47, DIG. 1

[56] References Cited

U.S. PATENT DOCUMENTS

| | | | |
|---|---|---|---|
| 2,967,988 | 1/1961 | Seright | 320/40 |
| 3,296,515 | 1/1967 | Knauth | 320/24 |
| 3,541,422 | 11/1970 | Paulkovich et al. | 320/39 |
| 3,781,631 | 12/1973 | Nelson et al. | 320/39 |
| 4,061,956 | 12/1977 | Brown et al. | 320/39 |
| 4,146,830 | 3/1979 | Foster | 320/39 |

Primary Examiner—Willliam M. Shoop
Assistant Examiner—Anita M. Ault
Attorney, Agent, or Firm—Charles W. MacKinnon

[57] ABSTRACT

A battery charging system having a charger control circuit which monitors one cell of a battery bank and controls the operation of a charging current source in accordance with the terminal voltage of the monitored cell. The charger control circuit includes an overcharge sensing circuit and a shorted cell sensing circuit, each being capable of triggering a separate output driver to interrupt current flow from the charging current source to the battery bank. The overcharge sensing circuit employs a time delay network to avoid nuisance charger system interruptions. The shorted cell sensing circuit also employs a time delay network to allow charging of heavily discharged or zero voltage batteries.

14 Claims, 2 Drawing Figures

BATTERY OVERCHARGE PROTECTION SYSTEM

BACKGROUND OF THE INVENTION

This invention relates generally to battery charging systems and more particularly to battery charging systems in which only a single cell of a battery is monitored to control the charging thereof.

Battery charging systems which sense predetermined conditions of a battery to control the charging thereof are well known. These include, battery charging systems which sense a fully charged or overcharged condition by checking overall battery bank terminal voltage, examples of such systems are shown in U.S. Pat. Nos. 3,296,515, 3,781,631, 4,061,956 and 4,146,830. Many rechargeable battery types have significantly lower terminal voltages when discharged. Undetected battery faults, such as deteriorated or shorted cells in systems which detect battery conditions by sensing terminal voltage may cause overcharging of the remaining cells without permitting a sufficient increase in the bank terminal voltage to actuate an overcharge sensing circuit. Therefore, in battery charging systems which base the charging function on overall battery bank terminal voltage, shorted cell sensing takes on added significance.

Shorted or defective cell sensing for many battery chargers, including those disclosed in the above referenced patents, and others such as described in U.S. Pat. Nos. 3,296,515 and 3,781,631, is accomplished by sensing low voltage at the battery terminals and discontinuing charging to the connected battery if the terminal voltage is lower than a predetermined normal rating. Some charging systems, such as that shown in U.S. Pat. No. 3,296,515 also include circuitry to override this feature by use of a test button which must be held on to force charging. However, larger batteries, which are often deeply discharged, may not regain rated voltage quickly under normal charging conditions.

Other battery charging systems detect defective cells by utilizing a voltage divider for sensing a moderate voltage imbalance between the two halves of the battery; see, for example, the above referenced U.S. Pat. No. 4,061,956. Such an arrangement, may, however, be ineffective if cell deterioration is approximately equal in each half of the battery.

Still other shorted or defective cell sensing battery charging systems include circuitry for continuous or periodic checking for abnormally high charger output currents in a constant voltage mode or timing a constant current charging mode to detect a significantly longer charging period than would normally be required to fully charge the connected battery. Either of these systems can shut down the charging circuit if battery faults are detected. However, both systems require a potentially damaging time delay to verify that a fault condition exists before interrupting the charging circuit.

SUMMARY OF THE INVENTION

Accordingly, it is an object of the present invention to provide a new and improved battery charger or charging system which senses the voltage of only one cell in a battery bank to regulate charging of the battery and yet reacts quickly to a failure of the system to avoid damage to the battery.

It is another object of this invention to provide in a battery charging system of the last mentioned type, circuitry to minimize nuisance shut-downs or trips of the system caused by relatively short voltage highs or spikes on the monitored cell.

It is a further object of this invention to provide a new and improved battery charging system of the above described type which is relatively uncomplicated, low cost and is convenient to operate.

The foregoing objects are accomplished in accordance with this invention in one form thereof by providing a battery charging system including a charger control circuit which monitors one cell of a battery bank and controls the operation of the charging current source in accordance with the terminal voltage of the monitored cell. Included within the charger control circuit is an overcharge sensing circuit for triggering a separate output driver or charger interrupt circuit. If the terminal voltage of the monitored cell exceeds a predetermined maximum voltage, as specified by the battery manufacturer, the charger control circuit causes the flow of current from the charging current source to the battery to be interrupted. The charger control system may be adjusted to operate on virtually any battery type or voltage As a protective feature, the charger control circuit utilizes a shorted cell sensing circuit which can also trigger the separate output driver to interrupt current from the charging current source. The shorted cell sensing circuit interrupts charging when the monitored cell voltage falls below 0.5 VDC, thereby to avoid continued charging of the battery bank while monitoring the shorted cell which could never reach specified cell terminal voltage. Continued charging under these conditions could cause the battery to boil dry and eventually melt down.

Situations periodically arise in which it is necessary to charge or recharge heavily discharged or zero voltage batteries. In order to accomplish this without charger interruption triggered by the shorted cell sensing circuit, a delay circuit is incorporated which permits charging for approximately 14 minutes while sensing a monitored cell voltage below 0.5 VDC. If the monitored cell voltage fails to rise to this level within the predetermined time, the shorted cell sensing circuit interrupts charger operation.

In order to minimize charger interruptions caused by spikes on the monitored cell or from other causes, the overcharge sensing circuit includes a delay circuit. The delay circuit interrupts the charging current to the battery by triggering the output driver circuit in response to the voltage on the monitored cell exceeding the trip point for at least 10 seconds. When the output driver circuit operates to interrupt charging for any reason, a visual indication is provided. The output driver circuit may be reset by a simple push button.

DETAILED DESCRIPTION OF THE PREFERRED EMBODIMENT

Figure 1:
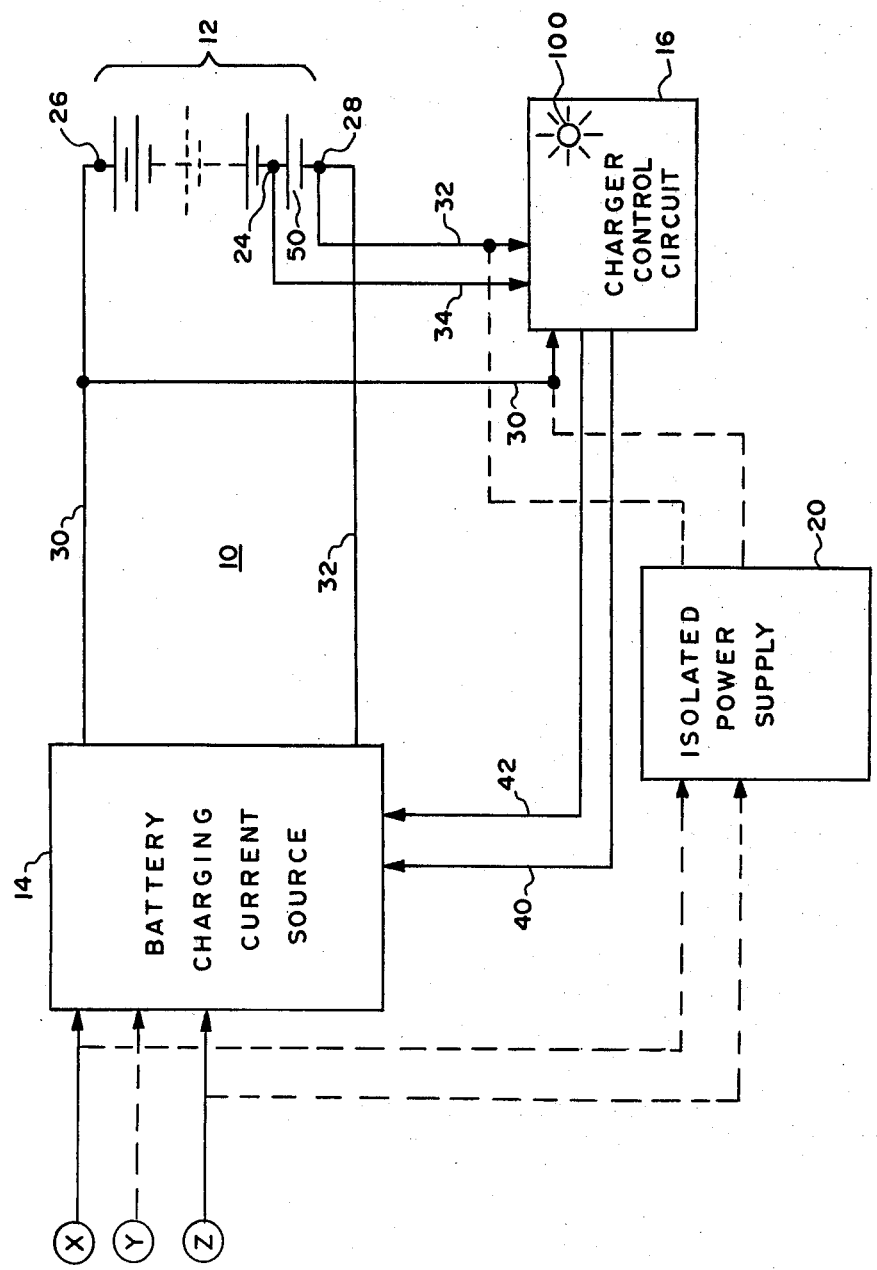
FIG. 1 is a block diagram of a battery charging system according to the invention.

Referring now to FIG. 1 of the drawings, the battery charger or charging system 10 includes three main components, a battery bank 12, a battery charging current source 14, and a charger control circuit 16. Battery charging current source 14 is connected to battery bank 12 at terminals 26, 28 by charger output lines 30, 32 and is connected to charger control circuit 16 by charger control leads 40, 42. Battery charging current source 14 may be powered by a DC or AC single or three phase power source through supply lines X, Y and Z, at, for example 120, 208, 240 or 480 volts depending on the power requirements of the system 10 and battery 12.

Operating power requirements for charger control circuit 16 may normally be supplied by battery 12 and current source 14 through output lines 30, 32. However, an isolated power supply 20 may be required to power charger control circuit 16 where it is undesirable or impossible to provide operating power to circuit 16 from charger output lines 30, 32, because of improper voltage or DC conditioning. Power from isolated supply 20 may be used alone or in addition to the power provided at charger output lines 30, 32.

Charger control circuit 16 monitors one cell 50 of battery bank 12 through terminals 24, 28 and leads 32, 34, to control the operation of battery charging current source 14 via control leads 40, 42 in accordance with the sensor terminal voltage of monitored cell 50.

Figure 2:
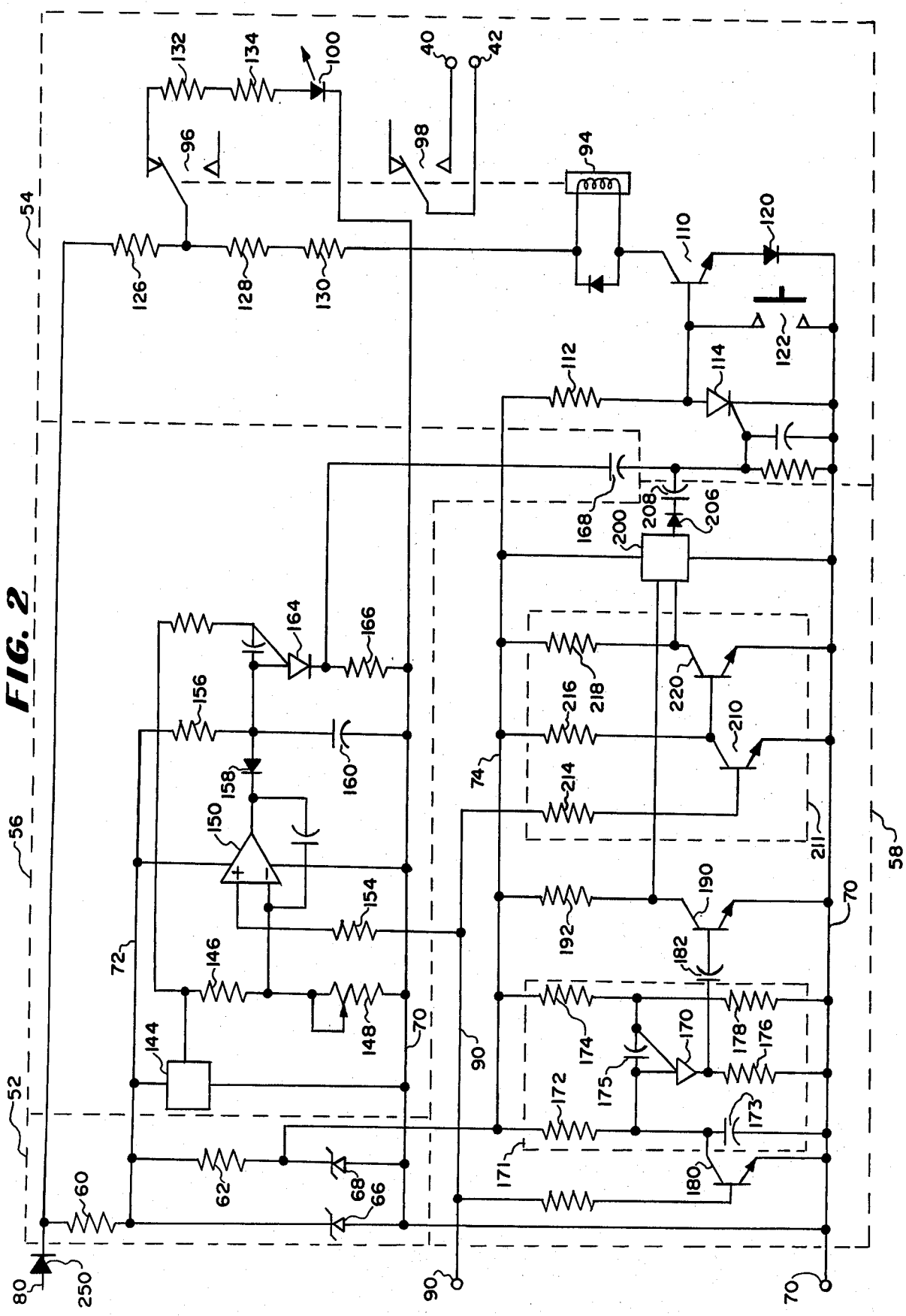
FIG. 2 is a schematic diagram of a preferred embodiment of the solid state charger control circuit included in the system of FIG. 1.

Referring now to FIG. 2 of the drawings, charger control circuit 16 includes four main circuit portions, a voltage regulator, overcharge sensor, a shorted cell sensor, and a relay or output driver.

Voltage regulator circuit portion 52 supplies and regulates power for the remainder of charger control circuit 16. As seen in FIG. 2, voltage regulator circuit portion 52 includes resistors 60, 62 and diodes 66, 68. In the preferred embodiment, diode 66 is at least a one watt zener diode with a voltage rating of between 12 and 20 volts. The voltage of diode 66 determines the potential across supply line 72 and neutral line 70. Diode 68 is also preferably at least a one watt zener diode and is rated at 7½ volts. Diode 68 determines the potential between supply line 74 and neutral 70. Resistor 60 is a voltage dropping resistor having a resistive value dependent upon the incoming supply voltage between supply line 80 and neutral line 70 and also upon the voltage rating of diode 66. Resistor 62 is also a voltage dropping resistor with a value dependent upon the voltages of diodes 66 and 68.

The relay or output driver circuit portion 54 energizes an output device. The preferred embodiment of output driver circuit portion 54 includes a relay coil 94 which operates two sets of contacts 96 and 98. The first contact set 96, completes a circuit to an LED 100 which serves to visually indicate circuit function. Contact set 98 is connected to control leads 40 and 42 which, in the preferred embodiment, are in series with the coil circuit of a power contactor in the input or output circuit (not shown) of charging current source 14.

As battery bank 12 is being charged, within output driver circuit portion 54, transistor 110 is normally biased "on" by the current through resistor 112. Relay coil 94 is energized at any time transistor 110 is turned "on", completing a connection via series contacts 98 between control leads 40 and 42, thereby allowing charging to continue. When a shut down conditions exists, silicon controlled rectifier or SCR 114 is "fired", bypassing the base current around transistor 110. Diode 120 which is in series with the emitter of transistor 110, increases the apparent emitter-to-base voltage of transistor 110 to a level higher than the "on-state" voltage of SCR 114. This decreases the voltage across relay coil 94, allowing coil 94 to deenergize thereby to interrupt current from charging current source 14 to battery 12.

Switch 122 operates as a manual reset by bypassing the anode current of SCR 114 to turn it off allowing relay coil 92 to reenergize. Resistors 126, 128, 130, 132 and 134 are selected to accomodate system voltages.

Overcharge sensor circuit portion 56 determines the charge condition of battery bank 12 by sensing the potential of monitored cell 50 between sense line 90 and neutral line 70. Sense line 90 is connected to positive terminal 24 of monitored cell 50 through line 34. Neutral line 70 is connected to line 32. Within overcharge sensor circuit portion 56, a precision voltage reference 144 has its output potential divided by a voltage divider comprising resistor 146 and potentiometer 148. The output of the voltage divider is used as a reference input to comparator 150. The reference voltage is adjustable by varying the resistance of potentiometer 148. Comparator 150 is a lower input offset operational amplifier with an inverted and non-inverted input. The inverted input is used as the reference input and the non-inverted input is coupled to sense line 90 through resistor 154.

As long as the terminal voltage of monitored cell 50 is below the reference voltage to the inverted input of comparator 150 the output of comparator 150 is a logic low. A low output from comparator 150 causes current to be drawn through resistor 156 and diode 158 to hold the voltage across capacitor 160 to a low level. When the output of comparator 150 switches high indicating an overcharged condition on monitored cell 50, diode 158 blocks current flow and capacitor 160 begins charging. The values of resistor 156 and capacitor 160 are selected to create an RC time constant which permits capacitor 160 to attain sufficient voltage applied across parallel connected SCR 164, to "fire" SCR 164 in approximately 8 to 10 seconds. As SCR 164 "fires", a voltage pulse develops across series resistor 166 which pulse is coupled through capacitor 168 to the gate of SCR 114 in the output driver circuit portion 54. This pulse "fires" SCR 114, thereby shutting down battery charging current source 114 as described above.

The shorted cell sensor circuit portion 58 detects a shorted or defective battery cell 50 by monitoring the cell potential between sense line 90 and neutral line 70 for very low cell voltage. A built in time delay allows charging of battery bank 12 in a heavily discharged or zero voltage state. Delayed timing is accomplished by a clock having a free running relaxation oscillator 171 which includes in combination SCR 170 resistors 172, 174, 176, 178 and capacitors 173 and 175. Transistor 180 gates oscillator 171 "off" when the cell voltage of monitored cell 50 exceeds 0.5 volts. Capacitor 182, transistor 190 and resistor 192 act as an inverter to invert the oscillator output pulse and condition it for acceptance by binary counter 200. When relaxation oscillator 171 is running, it has a period of approximately 200 milliseconds. The output of binary counter 200 switches high after 4096 input pulses. This develops a time delay in combination with oscillator 171 of approximately 800 seconds or 13.5 minutes. The output of counter 200 is coupled to the gate of SCR 114 through diode 206 and capacitor 208. As the output of counter 200 goes to a logic high, the positive going edge of the pulse "fires" SCR 114, thereby shutting down battery charging current source 14 as described above.

Reset circuit 211 is formed by transistors 210, 220 and resistors 214, 216, 218. The base of transistor 210 is coupled to sense line 90 through resistor 214. Transistor 210 turns "on" as the sense line voltage exceeds 0.5 volts DC. The collector of transistor 210 is connected directly to the base of transistor 220 which has its collector connected to the reset on counter 200. Therefore, as the voltage on monitored cell 50 exceeds 0.5 volts DC, transistor 210 turns on, transistor 220 turns off and the high voltage on the collector of transistor 220 resets counter 200.

Diode 250 couples the supply power to the charger control circuit and prevents fault current flow if the power supply is inadvertently connected in reverse.

Thus, as can be seen, charger control circuit 16, according to the invention, monitors one cell of battery bank 12 and controls the operation of battery charging current source 14 in accordance with the terminal voltage of monitored cell 50. The charger control circuit includes overcharge and shorted cell sensors which are unaffected by shorted or deteriorated cells elsewhere in battery bank 12, thereby, substantially reducing the possibility of overcharging, boiling dry and melting down battery bank 12.

While only a single embodiment of the invention has been shown and described herein, it will be realized that many modifications thereof are feasible without departing from the spirit and scope of the invention. It is accordingly intended that the scope of the invention not be limited to the more specific embodiment disclosed.

What is claimed is:

1. A battery charging system for charging a battery bank having a plurality of cells, said battery charging system comprising;
   a battery charging current source coupled electrically to said battery bank,
   a charger control circuit connected to only one of said plurality of cells including means for monitoring the voltage across said one cell, said charger control circuit also being connected to said battery charging current source for controlling the charging current from said source to said battery in response to the monitored voltage of said one battery bank cell, said charger control circuit including an overcharge sensor circuit portion and a shorted cells sensor circuit portion said overcharge and shorted cell sensing circuit portions being coupled to said battery bank for determining the condition of said battery bank by monitoring the potential of said one monitored cell.

2. A battery charging system as defined in claim 1 wherein said battery charging source and said battery bank are connected for supplying operating power to said charger control circuit.

3. A battery charging system as defined in claim 1, further including an isolated power supply means, said power supply means connected for supplying operating power to said charger control circuit.

4. A battery charging system as defined in claim 1 wherein said charger control circuit further includes an output driver circuit coupled to said overcharge and shorted cell sensing circuit portions, said output driver circuit including an output device for controlling the flow of current from said battery charging current source to said battery bank.

5. The battery charging system as described in claim 4 wherein said output device is an electro-mechanical relay.

6. A battery charger system as defined in claim 4 wherein said overcharge sensor circuit portion includes an adjustable reference supply and a comparator said comparator having first and second inputs and an output, said first input being coupled to said adjustable reference supply and said second input being coupled to said one monitored cell, said output being coupled to said output driver circuit, said comparator developing a logic level enabling signal at said comparator output whenever the potential from said reference supply on said first input exceeds the potential from said one monitored cell on said second input to cause said output driver circuit to interrupt the flow of current from said battery charging current source to said battery bank.

7. The battery charger system as defined in claim 6 wherein said adjustable reference supply includes a precision voltage reference and a voltage divider, said voltage divider comprising a fixed and variable resistor.

8. A battery charger system as defined in claim 6 wherein said overcharge sensor circuit portion further includes a time delay network coupled between said comparator output and said output driver circuit to minimize nuisance interruptions of said charging current source.

9. A battery charger system as defined in claim 8 wherein said time delay network includes an RC delay circuit coupled to an SCR pulse generation circuit.

10. A battery charger system as defined in claim 4 wherein said shorted cell sensor circuit portion includes a counter, an oscillator circuit and a reset circuit, said counter having a pulse input, a reset input and an output, said oscillator circuit being coupled to said pulse input, said reset circuit being coupled to said reset input and said counter output being coupled to said output driver circuit.

11. A battery charger system as defined in claim 10 wherein said oscillator circuit includes a free running relaxation oscillator having a pulse output, a gate control transistor and an inverter, said gate control transistor being coupled between said one monitored cell and said relaxation oscillator to gate said relaxation oscillator off as the potential of said one monitored cell exceeds a predetermined voltage, said inverter being coupled between said relaxation oscillator and said pulse input of said counter to condition said pulse output of said relaxation oscillator for acceptance by said pulse input of said counter.

12. A battery charger system as defined in claim 11 wherein said relaxation oscillator develops a pulse approximately every 200 milliseconds and said counter output develops a logic level enabling signal when said counter pulse input has received approximately 4,096 pulses, said logic level enabling signal triggering said output driver circuit to interrupt the flow of current from said battery charging current source to said battery bank.

13. A battery charger system as defined in claim 10 or 12 wherein said reset circuit includes a first and second transistors coupled between said one monitored cell and said reset input of said counter to reset said counter when the potential of said monitored cell reaches a predetermined voltage.

14. A battery charger system as defined in claim 1 wherein said charger control circuit further includes a voltage regulator circuit portion coupled to said overcharge sensor circuit portion and said shorted cell sensing circuit portion for providing stable operating potentials for said overcharged sensor circuit portion and said shorted cell sensing circuit portion.

* * * * *